(12) United States Patent
Glockler

(10) Patent No.: US 8,287,415 B2
(45) Date of Patent: Oct. 16, 2012

(54) TRANSMISSION UNIT, PARTICULARLY MULTI-RANGE TRANSMISSION

(76) Inventor: Dieter Glockler, Ulm (DE)

( * ) Notice: Subject to any disclaimer, the term of this patent is extended or adjusted under 35 U.S.C. 154(b) by 214 days.

(21) Appl. No.: 12/665,395

(22) PCT Filed: Jun. 13, 2008

(86) PCT No.: PCT/EP2008/004765
§ 371 (c)(1),
(2), (4) Date: Dec. 18, 2009

(87) PCT Pub. No.: WO2008/155070
PCT Pub. Date: Dec. 24, 2008

(65) Prior Publication Data
US 2010/0167865 A1     Jul. 1, 2010

(30) Foreign Application Priority Data

Jun. 20, 2007   (DE) .................. 10 2007 028 883

(51) Int. Cl.
*F16H 37/02*     (2006.01)

(52) U.S. Cl. ........ 475/218; 475/151; 475/211; 475/215; 475/219

(58) Field of Classification Search .................. 475/211, 475/215, 219, 73, 151, 218
See application file for complete search history.

(56) References Cited

U.S. PATENT DOCUMENTS

| | | | |
|---|---|---|---|
| 4,644,821 A * | 2/1987 | Sumiyoshi et al. ............. 475/66 |
| 5,643,131 A | 7/1997 | Kuhn et al. | |
| 6,413,185 B1 * | 7/2002 | Baginski et al. .............. 475/208 |
| 6,855,085 B1 * | 2/2005 | Gumpoltsberger ........... 475/211 |

(Continued)

FOREIGN PATENT DOCUMENTS

DE      887 457      8/1953

(Continued)

OTHER PUBLICATIONS

Translation of International Preliminary Report on Patentability dated Jan. 12, 2010 in corresponding PCT Application No. PCT/EP2008/004765.

(Continued)

*Primary Examiner* — Sherry Estremsky
(74) *Attorney, Agent, or Firm* — Faegre Baker Daniels LLP

(57) ABSTRACT

The invention relates to a transmission unit (1), particularly multi-range transmission (2), comprising an input (E) and an output (A) and arranged between them a continuously variable transmission part (3) and a mechanical transmission part (4), comprising two three-shaft planetary gear sets (5, 6), each having a first (5.1, 6.1), second (5.2, 6.2) and third shaft (5.3, 6.3), wherein the first shafts of both planetary gear sets can be connected to the input and at least one second or third shaft of the respective planetary gear set can be non-rotatable connected to the output (A). The invention is characterized in that the planetary gear sets can be connected via two shiftable coupling units (K1, K2), which can be selectively and alternately actuated, to form a four-shaft planetary gear set and that the first coupling unit (K1) is arranged between the first shaft (6.1) of the second planetary gear set (6) and the input, and the second coupling unit (K2) is arranged between the output and a shaft of the first and second planetary gear set respectively, wherein the second shaft (6.2) of the second planetary gear set and the third shaft (5.3) of the first planetary gear set (5) are non-rotatably connected to each other.

19 Claims, 3 Drawing Sheets

U.S. PATENT DOCUMENTS

| | | | |
|---|---|---|---|
| 7,288,041 B2 * | 10/2007 | Bucknor et al. | 475/151 |
| 7,347,801 B2 | 3/2008 | Guenter et al. | |
| 7,381,144 B2 * | 6/2008 | Meise et al. | 475/72 |
| 2006/0128514 A1 | 6/2006 | Glockler | |

FOREIGN PATENT DOCUMENTS

| | | | |
|---|---|---|---|
| DE | 35 38 343 | * | 5/1986 |
| DE | 43 08 761 | | 9/1994 |
| DE | 197 55 612 | | 6/1999 |
| DE | 199 02 084 | | 8/2000 |
| DE | 102 48 400 | | 4/2004 |
| DE | 10 2004 007 130 | | 9/2005 |
| DE | 10 2004 022 204 | | 12/2005 |
| DE | 10 2004 022 356 | | 12/2005 |
| EP | 0 843 111 | | 5/1998 |
| EP | 1 061 287 | | 4/2000 |
| EP | 1 333 194 | | 8/2003 |

OTHER PUBLICATIONS

Translation of Written Opinion in corresponding PCT Application No. PCT/EP2008/004765.

(*) = Foreign patent document together with English language abstract.

German Office Action dated Nov. 13, 2009 in corresponding German Application No. 10 2007 028 883.4 and English language translation of the same.

International Search Report dated Oct. 7, 2008 in PCT/EP2008/004765.

Written Opinion of the International Search Authority in PCT/EP2008/004765.

* cited by examiner

TRANSMISSION UNIT, PARTICULARLY MULTI-RANGE TRANSMISSION

CROSS-REFERENCE TO RELATED APPLICATION

This application is related to and claims the benefit under 35 U.S.C. §119 and 35 U.S.C. §365 of International Application No. PCT/EP2008/004765, filed , the reference of which is expressly incorporated herein by reference.

BACKGROUND

The invention relates to a transmission unit, particularly a multi-range transmission.

Transmission arrangements in the form of power branched transmissions in the form of superposition gears are known in a plurality of models. To illustrate, reference is made to the following publications:

1. EP 1 333 194
2. DE 197 55 612 A1
3. EP 1 061 287 A2
4. DE 43 08 761 A1
5. DE 887 457 C
6. DE 10 2004 022 204 B3

The model according to the publication DE 197 55 612 A1 comprises a transmission input shaft, a continuously variable transmission drive in the form of a traction drive coupled to the transmission output shaft, said transmission drive exhibiting an input and an output, wherein the input is non-rotatably connected to the transmission input shaft, a fixed transmission step as well as a superposition gear with a first input step, said input step being non-rotatably connected to the output of the continuously variable transmission drive. Further a second input step is provided which optionally by means of a first clutch can be connected to the transmission input shaft via the fixed transmission step and an output step, which is non-rotatably coupled to the transmission output shaft. In this connection the fixed transmission step is on the drive side non-rotatably coupled to the transmission input shaft and with respect to the fixed transmission step on the output side the first clutch is arranged in such a way that said clutch optionally connects the second input step of the superposition gear on the output side to the fixed transmission drive.

The continuously variable transmission is directly coupled to the transmission input and with this the drive shaft and hence also to the speed of the drive machine. A relief of the superposition gear in a range of higher speeds of the output shaft or of lower transmission ratios of the continuously variable transmission drive is achieved due to the fact that a second coupling is provided which optionally connects the first input step to the output step of the superposition gear. As a result a rigid connection between the output shaft of the continuously variable transmission drive and the output shaft is created, as a result of which the entire superposition gear is jumped in the torque flow. The continuously variable transmission drive can in dependence on its dimensioning only transfer a maximum permissible torque, otherwise in the case of very high loads impermissibly large slip states are to be observed, which lead to an increased wear on the traction mechanism. On the basis of the direct coupling of the continuously variable transmission to the transmission input said transmission input is however always subjected to the prevailing conditions on the transmission input. That means that the input of the CVT is impinged with the speed on the transmission input and with this of the drive machine.

From Publication EP 1 333 194 a transmission module is anticipated which with regard to its structure has been modified in such a way that the load of the traction drive could be considerably reduced and with this the transferability of higher performances via said traction drive could be ensured. In this model the transmission module is likewise constructed as a superposition gear unit. This comprises a transmission input and a transmission output, further two superposition gears arranged between the transmission input and transmission output and coupled with one another to a four-shaft planetary gear. Between the first superposition gear and the second superposition gear a continuously variable transmission is further interposed in the form of a traction drive. Each planetary gear comprises a sun gear, a ring gear, planetary gears and a planet carrier. The individual shafts in the process are formed by the sun gear, ring gear or planet carrier of the respective superposition gear. The transmission input is in the process non-rotatably connected to a first shaft of the first superposition gear and a first shaft of the second superposition gear. The transmission output is non-rotatably connected to a second shaft of the first superposition gear and a second shaft of the second superposition gear. The coupling of the two three-shaft planetary gears to a four-shaft planetary gear takes place in the process by coupling the first and second shafts of the first and second superposition gears. The individual shafts in the process assume the function of inputs and outputs depending on the operating state. Further means for the changing of the transmission ratio on the traction drive are provided. In the process one of the two superposition gears—first or second superposition gear—exhibits planetary gears combing with each other in pairs between the sun gear and ring gear. Said planetary gears are pivoted on the planet carrier. On the basis of this it is guaranteed for a sub-range of the total operating range that the CVT works at maximum rotational speed, wherein a switch with respect to the transmission ratio can also take place at the individual disks at maximum engine speed, that is a turning above zero is possible and hence with the inventive transmission along with a geared neutral also a change in the direction of rotation can be realized. The double-rotor design offers the advantage that in the case of an increase of the speed caused by them on the output coupled with the continuously variable transmission, in particular ring gear, this planetary gear brings about a reduction corresponding to the design of the other planetary gear on the output of the respective other planetary gear coupled with the continuously variable transmission, in particular the ring gear. However, according to this implementation it is not possible to have the continuously variable transmission work over the entire operating range many times at maximum rotational speed.

Another implementation of a multi-range transmission is anticipated from the publication DE 10 2004 022 204 B3. Said publication comprises only one simple planetary gear step, three spur wheel steps, two coupling units and one continuously variable transmission. The output shaft is optionally connected to the sun or gear ring shaft by means of the two coupling units.

The additional publications likewise disclose multi-range transmissions in which case two three-shaft planetary gear sets are combined into one four-shaft planetary gear set.

SUMMARY

The invention is based on the object of creating a multi-range transmission, comprising one mechanical and one continuously variable transmission part, in particular in the form of a traction drive and planetary gear sets which on the one hand is characterized by a high overall transmission spread and is further characterized by a relatively simple and space-saving structure in axial direction. Further it is possible to stop upon a very high relief in the second operating range with great time allowance, which corresponds to the operating range lying outside of the starting range and in the case of use in motor vehicles corresponds to the main operating range. In addition a geared neutral should also be possible with the inventive coupling structure, so that under circumstances also additional means for realization of reverse driving can be dispensed with.

The transmission unit, in particular the multi-range transmission, comprises at least one input and at least one output, further a continuously variable transmission part arranged between the input and the output and a mechanical transmission part, wherein the mechanical transmission part comprises a four-shaft planetary gear which consists of a first planetary gear set and a second planetary gear set, each comprising a first, second and third shaft, wherein the first shafts of both planetary gear sets can be connected to the input and the further shafts of the respective planetary gear set are each indirectly non-rotatably connected to the continuously variable transmission and are connected or can be connected to the output A.

As a result of this in all operating ranges there is no direct coupling between the transmission input shaft and the continuously variable transmission, in particular of the disk arrangement acting as input of the continuously variable transmission in the case of implementation as continuously variable transmission, but rather said coupling is realized via the first superposition gear. The continuously variable transmission is hence located with respect to the flow of power between the superposition gear and the output. The first shaft of the first planetary gear set is preferably non-rotatably connected to the input.

In accordance with the invention the planetary gear sets can be connected via two shiftable coupling units K1 and K2, which can be selectively and alternately actuated, to form a four-shaft planetary gear set. The first coupling unit K1 is arranged between the first shaft of the second planetary gear set and the input and the second coupling unit K2 is arranged between the output and one shaft each of the first and second planetary gear set, wherein the second shaft of the second planetary gear set and the third shaft of the first planetary gear set are non-rotatably connected to each other and the second shaft of the second planetary gear set and the third shaft of the first planetary gear set are each formed by the ring gears of the two planetary gear sets.

The inventive solution makes a transmission structure possible which is characterized by a compact axial length. The two planetary gear sets are arranged spatially close to one another. Further with the described transmission configuration in the case of corresponding design, in particular of the second planetary gear set also a geared neutral can be realized, as a result of which in particularly advantageous manner a separate arrangement for the realization of a reverse gear can be dispensed with.

Further, due to the inventive design of the coupling of the two ring gears of the planetary gear sets with each other said ring gears are arranged spatially close to one another. In accordance with an advantageous embodiment both ring gears are combined in an integral unit or only one joint ring gear is provided.

In accordance with an especially advantageous design in the case of the design of the ring gears as an integral unit the diameter and the design for both are the same. However, also conceivable, corresponding to the design of the first and second planetary gear set the ring gears are to be constructed with different diameters, so that the structural unit is then characterized by at least two sections of different diameter.

The first shafts of the first and second planetary gear set are in the case of a closed coupling unit K1 non-rotatably coupled with one another and are further connected to the input of the transmission unit. The first waves are in the process each formed by the planet carrier. The second shaft of the first planetary gear set and the second shaft of the second planetary gear set are connected to the continuously variable transmission, wherein the second shaft of the second planetary gear set can optionally be additionally connected to the transmission output A via the second coupling unit K2. The third shaft of the first planetary gear set can be connected to the output via the second coupling unit K2 and further to the continuously variable transmission. Each of the coupling units K1, K2 comprises a first coupling part, which is connected to the corresponding shafts of the planetary gear and an output part.

The coupling between the planetary gear drives and the continuously variable transmission takes place in the process not directly, but rather preferably via transmission steps, via which an increase as well as a decrease in speed can be achieved, wherein the increase can also be 1:1. The transmission steps are in the simplest case constructed as spur wheel steps each with an even or odd number of the spur wheels combing each other, wherein a spur wheel is non-rotatably connected to a shaft of the planetary gear sets, preferably forming a structural unit with said shaft.

In the case of the continuously variable transmission it is preferably a traction drive. In the process it can be a non-positive or a positive traction drive. In the simplest case this will comprise two disk arrangements, via which a traction means, preferably in the form of a belt or steel thrust belt runs, said belt or steel thrust belt working with adhesion. Other designs are conceivable. Further it is conceivable to use a mechanical continuously variable transmission in the form of a toroidal drive instead of a traction drive or also an electric transmission, which for example consists of two electric machines that can be operated as a generator and/or motor, said electric machines being coupled with one another via an intermediate voltage circuit.

The continuously variable transmission is assigned appropriate means for adjustment of the transferable proportion of output via the continuously variable transmission or for speed/torque conversion. Said means can be constructed depending on the design of the continuously variable transmission mechanical, hydraulic, electro-pneumatic. Other possibilities are also conceivable. In the case of design as a traction drive means are provided for adjustment of the variator space or of the running radius for the traction means to the individual disk arrangements.

The transmission input is preferably coaxial, but can also be concentric to the individual elements, continuously variable transmission, mechanical transmission part. Further concentricity or eccentricity can exist between the input and the output. This depends in particular on the concrete structure and the configuration of the transmission.

The inventive transmission is characterized by two coupling units, which are optionally switchable, wherein the actuation as a rule will take place alternately, however to prevent interruption of tractive force it will preferably take place in the case of synchronicity in superimposed manner, by two operating ranges, a first operating range, which is assigned to the first coupling unit, and describes the starting range and a second operating range, which corresponds to the operating range, which is used outside of the starting range. The design of the individual operating ranges follows through the design of the planetary gear sets, in particular the design of the sun gears. By variation of the dimensioning of the sun gear of the first planetary gear set the spread can be varied in the second driving range. Preferably said spread will be selected quite small. Through the inventive design it is in the process possible that for one thing a very high overall spread is achieved for both driving ranges together and further in both driving ranges or operating ranges a relief of the continuously variable transmission is achieved, in particular in the second driving range. In each of the individual operating ranges the speed and the torque are infinitely changeable.

Preferably the following transmission ratios are selected for the design of the planetary gear sets. The first planetary gear set is in the process characterized by a stationary transmission ratio of 1:1.62, that is, the sun gear is 1.62 times smaller than the ring gear. In addition the following transmission ratio ranges are conceivable, wherein the enumeration however is not complete: 1:1.62 through 1:2.5.

The inventive solution can be used both for motor vehicles as well as also for stationary applications, for example in wind power stations etc.

The inventive solution will be explained in the following with the help of a figure. An especially advantageous design of the inventive solution is represented in said figure. However the inventive solution is not restricted to the design in FIG. 1. Other modifications of the transmission configuration are possible.

DETAILED DESCRIPTION

Figure 1:
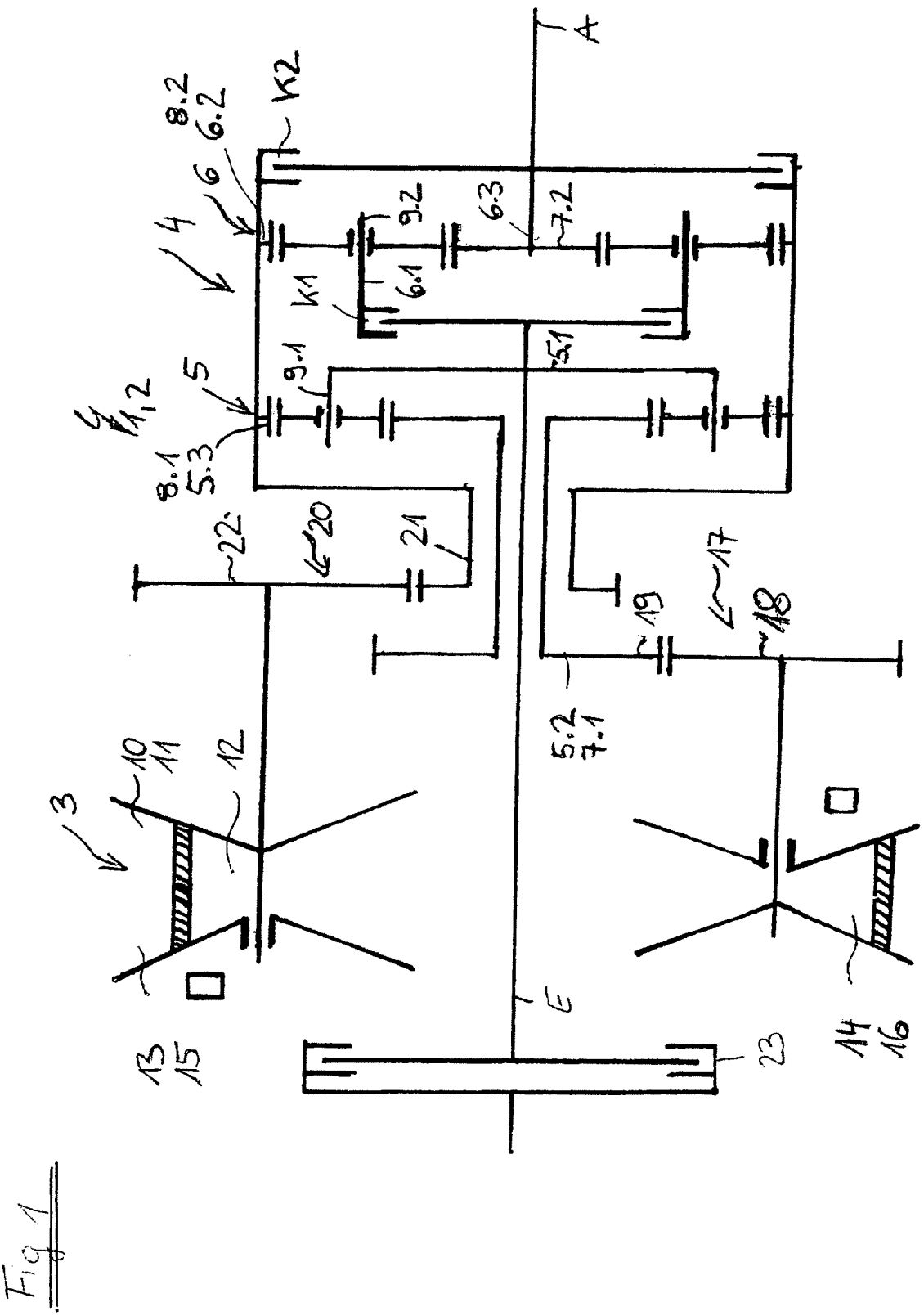
FIGS. 1, 2 and 3 illustrate a schematically simplified representation the basic structure of three embodiments of the transmission unit.

FIG. 1 illustrates in schematically simplified representation the basic structure of an inventively constructed transmission unit 1 in the form of a multi-range transmission 2. Said transmission comprises at least one input E and at least one output A. The input E in the process can be coupled at least indirectly with a drive machine not shown here, in which case it can be an internal combustion engine or another drive unit. The output A is coupled at least indirectly with further elements for power transfer, for example shaft assemblies etc., in particular in the case of use with motor vehicles.

The transmission unit 1 comprises a first continuously variable transmission part 3 and a second mechanical transmission part 4. Both transmission parts 3, 4 are arranged between input E and output A. The continuously variable transmission part 3 is in the process free from a direct coupling with the input E. The coupling of the continuously variable transmission part 3 with the input E and the output A takes place via the coupling with the mechanical transmission part 4. The mechanical transmission part 4 comprises two planetary gear sets 5 and 6, which are arranged coaxially to one another and considered in axial direction in the direction of the flow of power from input E to output A. The planetary gear sets 5 and 6 are constructed as three-shaft planetary gears, said three-shaft planetary gears in accordance with the invention being able to be connected to form a four-shaft planetary gear, wherein this ability to be connected is required for realization of the individual transmission ranges. Each of the planetary gear sets 5 and 6 comprises a first shaft 5.1 or 6.1, a second shaft 5.2, 6.2 and a third shaft 5.3 or 6.3. The first shafts 5.1 and 6.1 in the process can be connected at least indirectly to the input E. Preferably the coupling of the planetary gear set 5, in particular of the first shaft 5.1, takes place directly non-rotatably with the input E, while the first shaft 6.1 of the second planetary gear set 6 can be non-rotatably connected to the input E via first coupling unit K1. The second shafts 5.2 and 6.2 are each indirectly non-rotatably connected to the continuously variable transmission part 3 via a transmission step 17, 20. The third shaft 5.3 of the first planetary gear set 5 and the third shaft 6.3 of the second planetary gear set 6 can be non-rotatably connected to the output A. In the process the third shaft 6.3 of the second planetary gear set 6 can preferably be connected non-rotatably to the output A, while the third shaft 5.3 of the first planetary gear set 5 can, via a second coupling unit K2 be non-rotatably connected to the output A. In the process the non-rotatable connection also takes place between the first shaft 5.1 of the first planetary gear set 5 to the first shaft 6.1 of the second planetary gear set 6 via the first coupling unit K1. The coupling of the third shaft 5.3 of the first planetary gear set 5 with the third shaft 6.3 of the second planetary gear set 6 takes place via the second coupling unit K2. Further in accordance with the invention the third shaft 5.3 of the first planetary gear set 5 and the second shaft 6.2 of the second planetary gear set 6 are non-rotatably coupled with one another, preferably said shafts are constructed as a one-piece unit. In the process the individual shafts, first shaft 5.1, 6.1, second shaft 5.2, 6.2 and the third shaft 5.3 and 6.3 are each constructed as a sun gear, planet carrier or ring gear. FIG. 1 illustrates an especially advantageous design with a high function concentration and low number of components and low axial installation space, by means of which a multi-range transmission 2 can be achieved, which makes possible in both driving ranges, in particular in the second driving range, a very strong relief of the continuously variable transmission part 3. In the process the first shaft 5.1 of the first planetary gear set 5 is formed by the planet carrier 9.1, the second shaft 5.2 is formed by the sun gear 7.1 and the third shaft is formed by the ring gear 8.1. The individual shafts 6.1 through 6.3 of the second planetary gear set 6 are formed in the following manner: first shaft 6.1 by planet carrier 9.2, second shaft 6.2 by the ring gear 8.2 and the third shaft 6.3 by the sun gear 7.2.

The continuously variable transmission part 3 here comprises preferably a traction drive 10, in particular a continuously variable transmission 11. Said continuously variable transmission comprises a traction means 12, which is coupled with the mechanical transmission part 4 via transfer elements 13 and 14. The transfer elements 13 and 14 are constructed here as disk arrangements 15 and 16, which guide the traction means 12 on a diameter, wherein by adjustment of the disk spacing the effective diameter on the respective transfer element 13 or 14 can be altered for the traction means 12 and as a result a setting of the transferable torque takes place.

The two switchable coupling units K1 and K2 are preferably constructed in the form of frictionally engaged coupling units. In the simplest case these are constructed in disk design, in particular multi-disk design. These could work with slip. However, synchronously switchable coupling units are also conceivable. Each of the coupling units K1 and K2 can in the process be used for an operating range. In a first operating range the coupling unit K1 is actuated. The power transfer takes place from input E to output A via the first planetary gear set 5, in particular the planet carrier 9.1, to the sun gear 7.1 and from said sun gear via the coupling with the continuously variable transmission to said continuously variable transmission. In the process the coupling takes place via a transmission step 17, which in the simplest case can be formed directly by an element directly coupled with the sun gear 7.1 or by the sun gear 7.1 itself and a further element coupled non-rotatably with a transfer element 14 of the traction drive 10, wherein said transfer element is for example formed by a spur wheel 18, which combs with the gear wheel 19 that is non-rotatably coupled with the sun gear 7.1. It is also conceivable to use other transfer elements than a spur wheel step here; preferably however a spur wheel is used, which guarantees a fixed transmission ratio. In analogy also the second shaft 6.2 of the second planetary gear set 6 and the third shaft 5.3 of the first planetary gear set are indirectly non-rotatably coupled with the traction drive 10, in particular the transfer element 13 in the form of the disk arrangement 15. This coupling also takes place preferably via a transmission step 20, which is formed here by a spur wheel 21 non-rotatably coupled with the shafts 6.2, 5.3 constructed as a single-part ring gear and a spur wheel 22 non-rotatably coupled with the disk arrangement 15. Here also the transmission step 20 is constructed as a spur wheel step. In the process the transmission can take place with a fixed transmission ratio of 1:1 or also with an increase or decrease in speed.

The power transfer in the first operating range takes place then via the traction means 12, the transmission step 20 to the ring gear 8.1 and 8.2 and via the coupling of the first shaft 5.1 of the first planetary gear set 5 with the first shaft 6.1 of the second planetary gear set 6 to it, wherein via the corresponding conditions in the second planetary gear set 6 the third shaft 6.3, in particular the sun gear 7.2 and with it output A are driven. In the case of synchronicity between the speed of the ring gear 8.2 and the sun gear 7.2 of the second planetary gear set 6 a release of the first coupling unit K1 and a closing of the second coupling unit K2 takes place. In this case the power from the input to the output via the first planetary gear set 5, the continuously variable transmission, in particular of the traction drive 10 to the second planetary gear set 6, which is effectively jumped via the second coupling unit K2, is transferred to the output A. In both operating ranges in the process an adjustment to the variator disks of the disk arrangements 15 and 16 takes place in parallel, so that the transmission ratio changes in the continuously variable transmission part 3. In the process in each operating range preferably the entire setting range to the variator disks is traveled in both directions, that is smaller diameter to greater diameter and vice versa.

In the first operating range the speed adjustment follows at output A and with this of the third shaft 6.3 in the form of the sun gear 7.2 of the second planetary gear set 6 of the speed adjustment on the ring gear 8.2. The speeds of both planet carriers 9.1, 9.2 of both planetary gear sets 5 and 6 are identical due to the fixed coupling. If the continuously variable transmission 3, in particular the traction drive 10, is adjusted down to its minimum transmission ratio, the output speed increases with a speed zero crossing to the coupling point of both planetary gear sets 5, 6, wherein the driving range changeover takes place without additional synchronization by closing of the second coupling unit K2 and opening of the first coupling unit K1 in the case of speed equality between sun gear 7.2 and ring gear 8.2. In the second driving range the second planetary gear step 6 is jumped in the coupling point by the coupling unit K2. All shafts 6.1, 6.2 and 6.3 of this step and with this also the output are, with the speed adjustment of the ring gear shaft 5.3 of the first planetary gear step 5 to the according to the amount greater speeds in the case of the adjustment of the variator, in particular of the disk arrangements 15 and 16, impinged to their maximum transmission ratio.

The transmission structure is designed in such a way that it greatly relieves the second driving range, which in the case of use in motor vehicles as a rule corresponds to the main usage range and which is characterized by a greater time allowance (circa 80%), than the first driving range. In the case of a stationary transmission ratio of for example 1.62 the proportion of output which flows via the variator at maximum overdrive transmission is only 10%. As a result the continuously variable transmission exhibits a very good efficiency and a long service life. The four-shaft planetary gear has a joint ring gear with equal size and identical number of teeth. As a result, on the one hand the expenditure for production can be considerably reduced and the transmission does not build very large in axial and radial direction. Further the transmission is, in the case of corresponding design, also geared neutral capable, that is, a turning above zero can take place. In accordance with an especially advantageous embodiment however a reverse gear set for reverse driving is recommended in order not to place too great of a load on the transmission unit in the first driving range. Possible transmissions of the second planetary gear set are characterized by a stationary transmission in the range of 1:1.7 to 1:3. Further the spread $\phi$=is circa 6 to geared neutral and reversal of the direction of rotation.

The described transmission structure is characterized by a low number of components and requires in axial direction only slight installation space. Further these types of transmission structures are also hybrid-capable. In this case said transmission structures are assigned at least one electric machine that can be operated as a generator, which can be used both for starting as well as also recuperation of the braking energy.

All components of the transmission structure are arranged coaxially to one another, that is the continuously variable transmission, planetary gear set 5 and second planetary gear set 6 as well as input E and output A are arranged coaxially to one another. The transmission structure represented in FIG. 1 further contains a starting clutch 23, which is arranged between the input and a drive machine.

Figure 2:
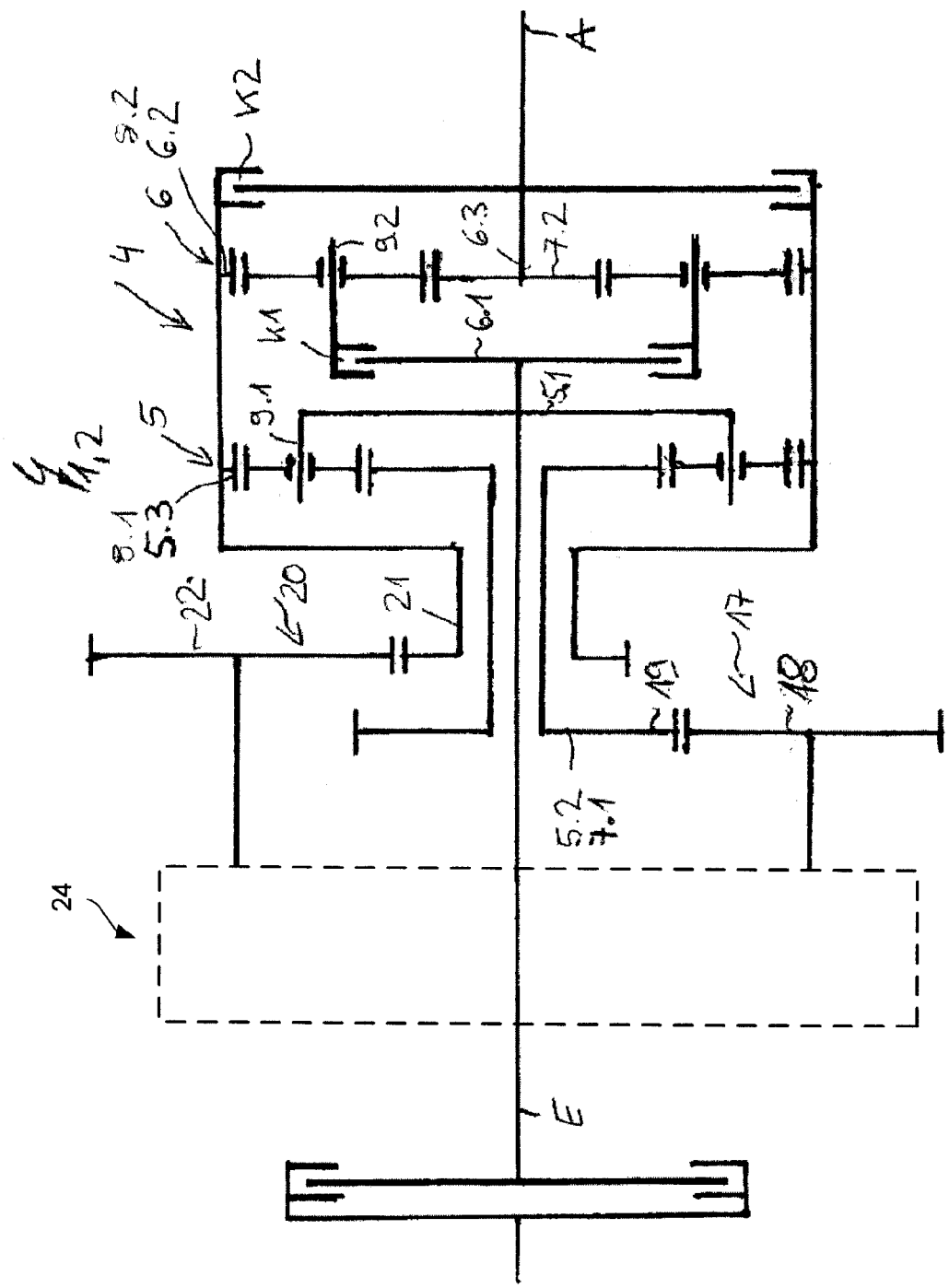
Figure 3:
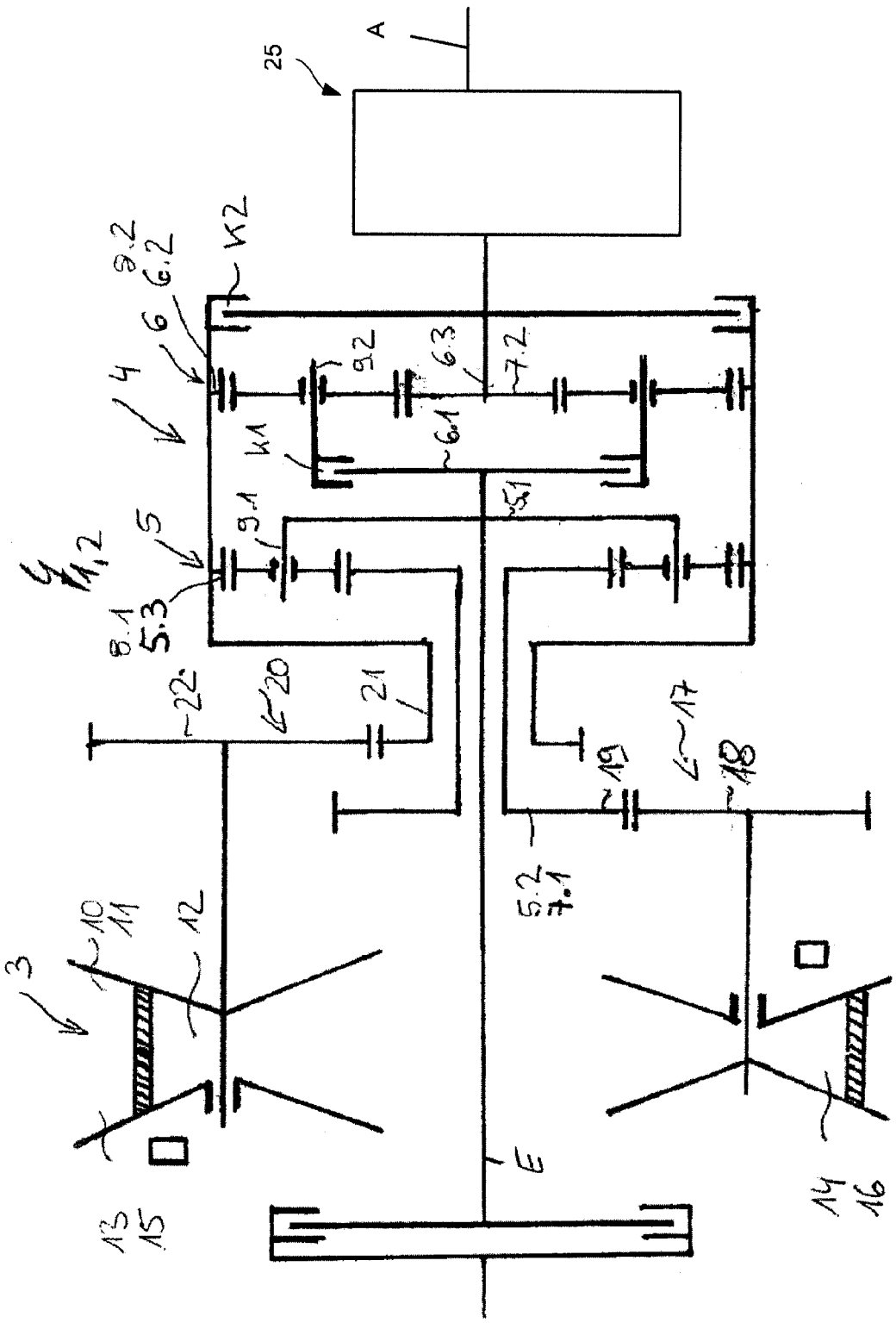

FIG. 2 illustrates a further embodiment of the invention including an electric transmission 24. FIG. 3 illustrates a third embodiment invention including a reverse gear set 25.

LIST OF REFERENCE SYMBOLS

1 Transmission unit
2 Multi-range transmission
3 Continuously variable transmission part
4 Mechanical transmission part
5 First planetary gear set
5.1 First shaft
5.2 Second shaft
5.3 Third shaft
6 Second planetary gear set
6.1 First shaft
6.2 Second shaft
6.3 Third shaft
7.1 Sun gear
7.2 Sun gear
8.1 Ring gear
8.2 Ring gear
9.1 Planet carrier
9.2 Planet carrier
10 Traction drive
11 Continuously variable transmission
12 Traction means
13 Transfer element, Variator
14 Transfer element, Variator
15 Disk arrangement
16 Disk arrangement
17 Transmission step
18 Spur wheel 19 Spur wheel
20 Transmission step
21 Spur wheel
22 Spur wheel
23 Starting clutch
24 Electric transmission
25 Reverse gear set
K1 First coupling unit
K2 Second coupling unit

The invention claimed is:

1. A multi-range transmission unit, comprising one input and one output and a continuously variable transmission part arranged between said input and output and a mechanical transmission part, comprising two three-shaft planetary gear sets which each comprise a first, second and third shaft, wherein the first shaft of a first one of the planetary gear sets is connected to the input and the first shaft of a second of the planetary gear sets is connected to the input via a coupling and the further shafts of the respective planetary gear set are at least indirectly non-rotatably connected to the continuously variable transmission part and can be connected to the output, wherein the planetary gear sets can be connected via two shiftable coupling units, which can be selectively and alternately actuated, to form a four-shaft planetary gear set and the first coupling unit is arranged between the first shaft of the second planetary gear set and the input and the second coupling unit is arranged between the output and one shaft each of the first and second planetary gear sets, wherein the second shaft of the second planetary gear set and the third shaft of the first planetary gear set are non-rotatably connected to each other, wherein the second shaft of the second planetary gear set and the third shaft of the first planetary gear set are each formed by ring gears of the respective planetary gear sets.

2. The transmission unit according to claim 1, wherein the second shaft of the second planetary gear set and the third shaft of the first planetary gear set are formed by a shaft.

3. The transmission unit according to claim 2, wherein the second shaft of the second planetary gear set and the third shaft of the first planetary gear set-are identical with respect to the design and dimensioning.

4. The transmission unit according to claim 2, wherein the first shafts of the first and second planetary gear sets are formed by a planet carrier of the respective planetary gear sets.

5. The transmission unit according to claim 2, wherein the second shaft of the first planetary gear set is formed by a sun gear of the first planetary gear set.

6. The transmission unit according to claim 1, wherein the second shaft of the second planetary gear set and the third shaft of the first planetary gear set are identical with respect to the design and dimensioning.

7. The transmission unit according to claim 6, wherein the first shafts of the first and second planetary gear sets are formed by a planet carrier of the respective planetary gear sets.

8. The transmission unit according to claim 1, wherein the first shafts of the first and second planetary gear sets are formed by a planet carrier of the respective planetary gear sets.

9. The transmission unit according to claim 1, wherein the second shaft of the first planetary gear set is formed by a sun gear of the first planetary gear set.

10. The transmission unit according to claim 1, wherein the third shaft of the second planetary gear set is formed by a sun gear of the second planetary gear set.

11. The transmission unit according to claim 1, wherein the coupling between the second shafts of the planetary gear sets with the continuously variable transmission part takes place via a transmission step.

12. The transmission unit according to claim 11, wherein the transmission step comprises a spur wheel step with at least two spur wheels combing each other.

13. The transmission unit according to claim 11, wherein the first and the second planetary gear sets are arranged behind the transmission steps-spatially considered in axial direction.

14. The transmission unit according to claim 1, wherein the continuously variable transmission is constructed as a traction drive.

15. The transmission unit according to claim 14, wherein the traction drive is constructed as either a positive connection drive or a non-positive friction traction drive.

16. The transmission unit according to claim 1, wherein the continuously variable transmission is constructed as an electric transmission.

17. The transmission unit according to claim 1, wherein the coupling units are constructed as frictionally engaged coupling units.

18. The transmission unit according to claim 1, wherein the coupling units are constructed as synchronously switchable coupling devices.

19. The transmission unit according to claim 1, including a reverse gear set.

* * * * *